(12) United States Patent
Quartarone (10) Patent No.: US 7,077,358 B1
(45) Date of Patent: Jul. 18, 2006

(54) HELICOPTER WITH TORQUE-CORRECTING THRUSTER DEVICE

(75) Inventor: James R. Quartarone, Boulder, CO (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 24 days.

(21) Appl. No.: 11/045,038

(22) Filed: Jan. 27, 2005

(51) Int. Cl.
*B64C 27/82* (2006.01)

(52) U.S. Cl. .................................................. 244/17.19
(58) Field of Classification Search ............. 244/17.19, 244/17.11, 17.21, 23 B, 23 C
See application file for complete search history.

(56) References Cited

U.S. PATENT DOCUMENTS

| | | | | |
|---|---|---|---|---|
| 2,486,272 | A * | 10/1949 | Gazda ....................... | 244/17.19 |
| 3,807,662 | A * | 4/1974 | Velazquez ................. | 244/17.19 |
| 3,957,226 | A | 5/1976 | Daggett et al. | |
| 4,200,252 | A * | 4/1980 | Logan et al. ............. | 244/17.19 |
| 4,660,785 | A * | 4/1987 | Munski ..................... | 244/17.19 |
| 4,799,629 | A * | 1/1989 | Mori ......................... | 244/23 C |
| 4,948,068 | A * | 8/1990 | VanHorn .................. | 244/17.19 |
| 5,163,638 | A * | 11/1992 | Chaneac ................... | 244/17.19 |
| 5,174,523 | A * | 12/1992 | Balmford .................. | 244/17.11 |
| 5,205,512 | A * | 4/1993 | Rumberger ............... | 244/17.19 |
| 5,232,183 | A * | 8/1993 | Rumberger ............... | 244/17.19 |
| 5,240,205 | A | 8/1993 | Allongue | |
| 5,503,351 | A * | 4/1996 | Vass .......................... | 244/34 A |
| 5,649,678 | A * | 7/1997 | Nurick ..................... | 244/17.19 |
| 5,779,188 | A * | 7/1998 | Frick ......................... | 244/4 A |
| 5,934,608 | A * | 8/1999 | Dockter .................... | 244/17.19 |
| 6,036,141 | A * | 3/2000 | Clay ......................... | 244/17.19 |
| 6,086,016 | A * | 7/2000 | Meek ........................ | 244/17.11 |
| 6,352,220 | B1 * | 3/2002 | Banks et al. ............. | 244/17.19 |
| 6,622,962 | B1 * | 9/2003 | White ........................ | 244/7 R |
| 6,755,374 | B1 * | 6/2004 | Carson ..................... | 244/17.19 |

OTHER PUBLICATIONS http://en.wikipedia.org/wiki/Jet_engine, available on the web Jul. 16, 2004.*
http://en.wikipedia.org/wiki/Helicopter_flight_controls, available on the web Feb. 13, 2004.*

\* cited by examiner

*Primary Examiner*—Teri Pham Luu
*Assistant Examiner*—Edward J. Mayle
(74) *Attorney, Agent, or Firm*—James M. Kasischke; Michael P. Stanley; Jean-Paul A. Nasser (57) ABSTRACT

A helicopter having a torque-correcting thruster device. The helicopter has an aerodynamic body which has opposite side portions, a top portion and a bottom portion. The aerodynamic body has a cockpit and a pilot seat in the cockpit. The helicopter includes landing gear attached to the bottom portion of the aerodynamic body. The helicopter includes a rotor that is supported by the aerodynamic body and a rotor blade attached to the rotor, and a thruster device operative on one of the side portions of the aerodynamic body to produce an aft-directed thrust that counteracts the torque produced by rotation of the rotor blade so as to control the yaw of the helicopter. The aft-directed thrust simultaneously supplements the forward thrust of the helicopter.

4 Claims, 8 Drawing Sheets

HELICOPTER WITH TORQUE-CORRECTING THRUSTER DEVICE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

The present invention generally relates to a helicopter having a torque-correcting thruster device.

2. Description of the Prior Art

Figure 1A:
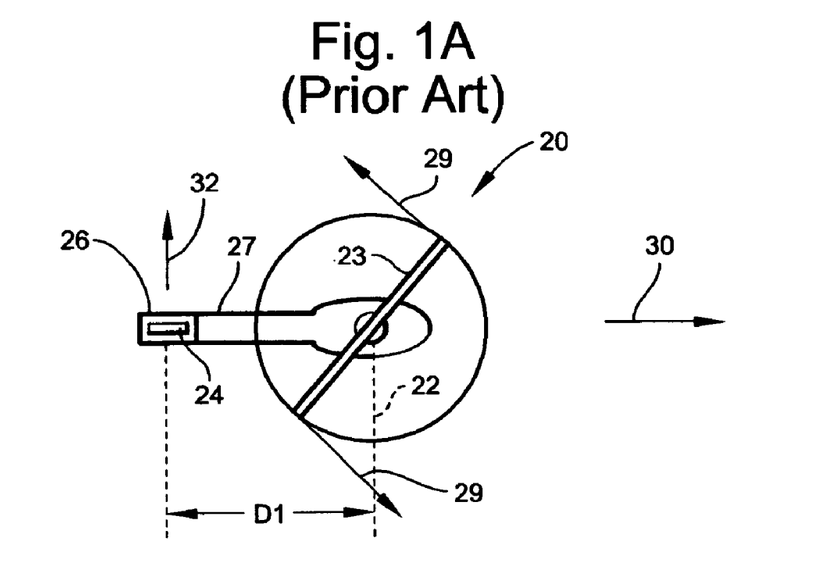
FIG. 1A is top view of a prior art helicopter.
Figure 1B:
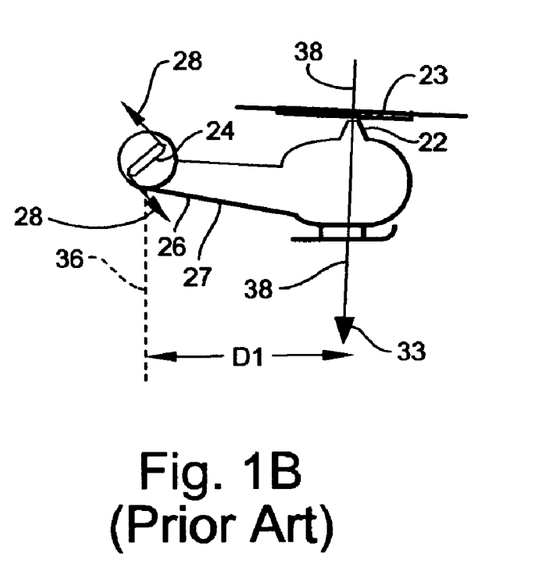
FIGS. 1B and 1C show side elevational views of the prior art helicopter of FIG. 1A in flight.
Figure 1C:
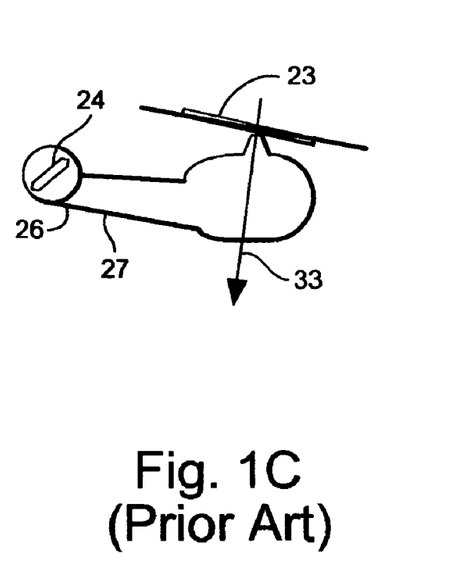

Helicopters have either one or two main lifting rotors. Controlling yaw is essential in preventing the helicopter from spinning out of control. In tandem rotor helicopters, those helicopters having two lifting rotors, both the propulsive force and those forces required for directional or yaw control are provided by the main rotors. An inherent aspect of controlling the yaw of the single rotor helicopter is the counteraction of the torque generated in driving the main rotor of the helicopter. This torque tends to rotate the entire aircraft in a direction opposite to the rotation of the main lifting rotor. This torque is generated by the resistance of the air to the driving of the rotor. The force required to counteract the torque is relatively large compared to the amount of force required to vary the attitude of the aircraft about its yaw axis. FIGS. 1A, 1B and 1C show a conventional single rotor helicopter 20. In this type of helicopter, the propulsive force is provided by main lifting rotor 22 and rotor blades 23 while yaw control has generally been provided by a second and smaller stabilizing rotor 24 located at the rear or tail 26 of boom 27. Rotor 24 rotates counter-clockwise as indicated by arrows 28. Stabilizing rotor 24 controls the yaw of helicopter 20. Rotor blades 23 overlap and rotate over a portion of boom 27. As shown in FIG. 1A, rotor blades 23 rotate counter-clockwise as indicated by arrows 29. The primary direction of flight of helicopter 20 is indicated by arrow 30. Stabilizing rotor 24 produces a sideways thrust indicated by arrow 32. Main lifting rotor 22 produces a downward thrust indicated by reference numeral 33. Sideways thrust 32 does not contribute to the forward thrust of the helicopter and is therefore wasted. A moment arm is defined by the distance D1 between stabilizing rotor 24, as measured from reference axis 36, and main rotor axis 38.

Figure 2A:
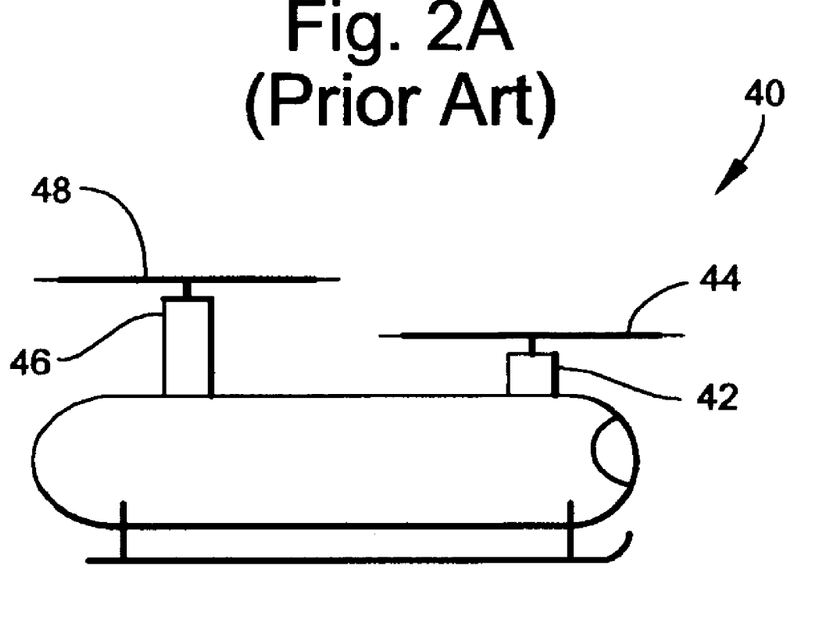
FIG. 2A is side elevational view of another prior helicopter.
Figure 2B:
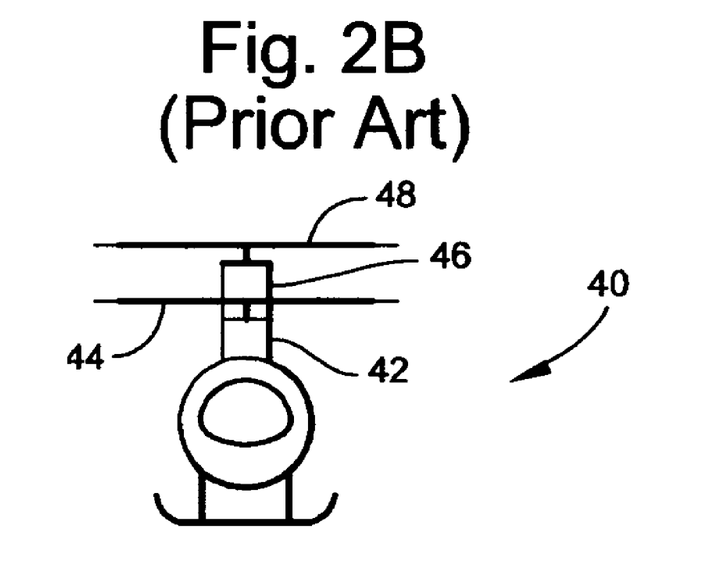
FIG. 2B is a front view of the helicopter of FIG. 2A.

A conventional tandem rotor helicopter is shown in FIGS. 2A and 2B. Tandem rotor helicopter 40 has main rotor 42 that rotates blade 44 in one direction and a second main rotor 46 that rotates blade 48 in an opposite direction. The simultaneous operation of main rotors 42 and 46 substantially eliminates net torque effect. However, the tandem rotor configuration is relatively complex and expensive. Furthermore, tandem rotor helicopters are typically not as maneuverable as single rotor helicopters.

Another prior art technique to counteract the aforementioned torque has been to use two lifting rotors mounted on a common shaft wherein the rotors rotate in opposite directions. The torque generated each rotor counteracts the other rotor. By changing the torque of one rotor relative to the other, directional control is achieved. A further prior art manner in which directional control is accomplished has been to mount jets at the tail of the rotor craft. However, these prior art devices contribute significantly to the cost of the helicopter. Furthermore, the size of the helicopter must be increased in order to implement these prior art configurations for controlling yaw.

The prior art in Daggett, Jr. et al. U.S. Pat. No. 3,957,226 ("Daggett") and Allongue U.S. Pat. No. 5,240,205 ("Allongue") describe various apparatuses and devices to counteract torque. For example, Daggett describes ducted air flow that is directed aft and which flows downward through the center of the helicopter tail (identified as the aft portion). However, such ducted air flow does not provide counter torque. When the flow is directed to the side, such side-directed flow may provide a torque-correcting flow but does not contribute to the forward movement of the aircraft. Furthermore, the air flows are shared. This means that the more flow that is used to produce counter torque, less flow is available for use in forward thrust. Thus, if all the flow is used for counter-torque, then no flow will be available for forward thrust. Conversely, if all the flow is used for forward thrust, then no flow will be available for counter-torque. Allongue U.S. Pat. No. 5,240,205 describes a helicopter having a single mechanically-driven lift and propulsion rotor and a fuselage that is rearwardly elongate. The helicopter has an anti-torque system that comprises an auxiliary anti-torque rotor whose axis is substantially transverse relative to the elongate fuselage and which is disposed at the rear end of the fuselage to generate a first transverse force. This transverse force opposes the torque exerted on the fuselage by the lift and propulsion rotor of the helicopter. The anti-torque system includes a blowing anti-torque device that comprises at least one longitudinal slot formed in the side of the portion of the elongate fuselage that is subjected to the downdraft from the lift and propulsion rotor. The longitudinal slot is fed with fluid under pressure that it ejects downward in a manner that is at least approximately tangential to the portion of the fuselage to generate a second transverse force in the same direction as the first transverse force. The anti-torque system also has a vertical fin disposed at the rear end of the elongate fuselage. The vertical fin has a particular profile such that during forward flight, the vertical fin generates lateral lift in the same direction as the first and second transverse forces. However, the aforementioned blowing device is not used to directly counter the main rotor torque. Rather, the blower redirects some of the main-rotor downward flow (and forces) to a slightly lateral direction. The redirected main-rotor flow forces counteract the main-rotor torque. Stated another way, the force of the blowing device does not counter the torque of the main rotor and thrust, and does not impart an aft-directed thrust or force. Instead, the blowing device functions as a fluidic device that causes the rotor flow to move in a different direction rather than substantially straight down. A significant disadvantage of the anti-torque system of Allongue is the substantial cost in implementing such a system.

What is needed is a new and improved helicopter that addresses the issue of yaw control but which is relatively less complex than prior art helicopter configurations, and does not utilize wasteful side forces as a means of counteracting main rotor torque.

SUMMARY OF THE INVENTION

Therefore, an object of the present invention is to provide a new and improved helicopter that is configured to efficiently and accurately control yaw.

Another object of the present invention to provide a new and improved helicopter that is configured to efficiently and accurately control yaw and which has relatively lower manufacturing cost.

It is another object of the present invention to provide a new and improved helicopter that is configured to efficiently and accurately control yaw and which allows the overall size of the helicopter to be reduced.

Other objects and advantages of the present invention will be apparent from the ensuing description.

A significant feature of the thrusting device is that it produces counter torque and forward thrust out of the same aft-directed air flow or thrust. Thus, an increase in counter torque produced by the aft-directed thrust causes a proportional increase in forward thrust.

Thus, in accordance with the aforesaid objects, the present invention is directed to a helicopter having an apparatus for efficiently controlling the yaw of a helicopter which comprises a rearward-facing thrusting device. The thrusting device aims in an aft or backward direction and supplies a restoring torque to the helicopter without having any deleterious effects on the capability of the helicopter to turn and hover. The thrusting device counters and controls the main rotor torque while adding to the forward thrust of the helicopter. The thrusting device can be fully integrated into the craft, within the basic contour of the helicopter body, or mounted to the exterior of the helicopter.

In one embodiment, the rearward-facing thruster device is mounted or located on the side of the helicopter which, when the thruster device is producing the aft-directed thrust, counteracts the main rotor torque. For example, if the single main rotor (as viewed from above the helicopter looking down at the rotor) is rotating counter-clockwise, then the thruster device is located on the right side of the helicopter (as viewed from the rear of the helicopter) and a predetermined distance from the main rotor axis center line. Any extra thrust required from the thruster device as a result of the thruster device being located closer to the main rotor axis center line is used to supplement the forward thrust of the helicopter.

The thruster device can be configured as a pod that is attached to the side of the helicopter and which has a rotor mechanism located therein. The thruster device also can be configured as a jet engine, a propeller driven by a piston or a turbo-prop power plant, or a hybrid-type jet engine/turbo generator that supplies mechanical power to the main rotor and has sufficient thrust to still act like a jet.

An advantage of the present invention is that preexisting helicopters can be configured or retrofitted in accordance with the invention. Thus, the thrusting device can be mounted on the pre-existing helicopter. In the case of new helicopters that are to be manufactured in accordance with the invention, the thrusting device can be integrally formed with the body of the helicopter or attached to the exterior of the helicopter.

Another advantage of the present invention is that helicopters can be configured without tail rotors and tail rudders. Thus, helicopters manufactured in accordance with the present invention can be made relatively shorter than conventional helicopters. Relatively smaller-dimension helicopters would provide significant benefits in the application of aircraft carrier-based helicopters since available space on an aircraft carrier is at a premium. In another embodiment, the helicopter can be configured with a relatively small-sized tail (e.g. similar to a skeg) or a relatively small-sized tail-rudder structure. In such an embodiment, the thruster device can be optionally mounted to the side of the aforementioned small-sized tail.

Thus, in one aspect, the present invention is directed to a helicopter that comprises an aerodynamic body that has a left side portion, a right side portion, a top portion, a bottom portion, and a cockpit area. The helicopter further includes a pilot seat in the cockpit, landing gear attached to the bottom portion of the aerodynamic body, and a rotor supported by the aerodynamic body. The rotor has a portion extending from the top portion of the aerodynamic body. The helicopter further includes rotor blades that are attached to the portion of the rotor that extends from the top portion of the aerodynamic body. The rotor blades rotate above the aerodynamic body wherein rotation of the rotor blades produces a torque. The helicopter further includes a thruster device operative on one of the side portions of the aerodynamic body to produce an aft-directed thrust that counteracts the torque to control the yaw of the helicopter and supplements the forward thrust of the helicopter.

Thus, the present invention is a device rearward thrusting attached to a helicopter to efficiently and economically control the yaw of the helicopter, without interfering with helicopter operation.

BRIEF DESCRIPTION OF THE DRAWINGS

The foregoing features of the present invention will become more readily apparent and may be understood by referring to the following detailed description of an illustrative embodiment of the present invention, taken in conjunction with the accompanying drawings, in which.

DESCRIPTION OF THE PREFERRED EMBODIMENTS

Figure 3:
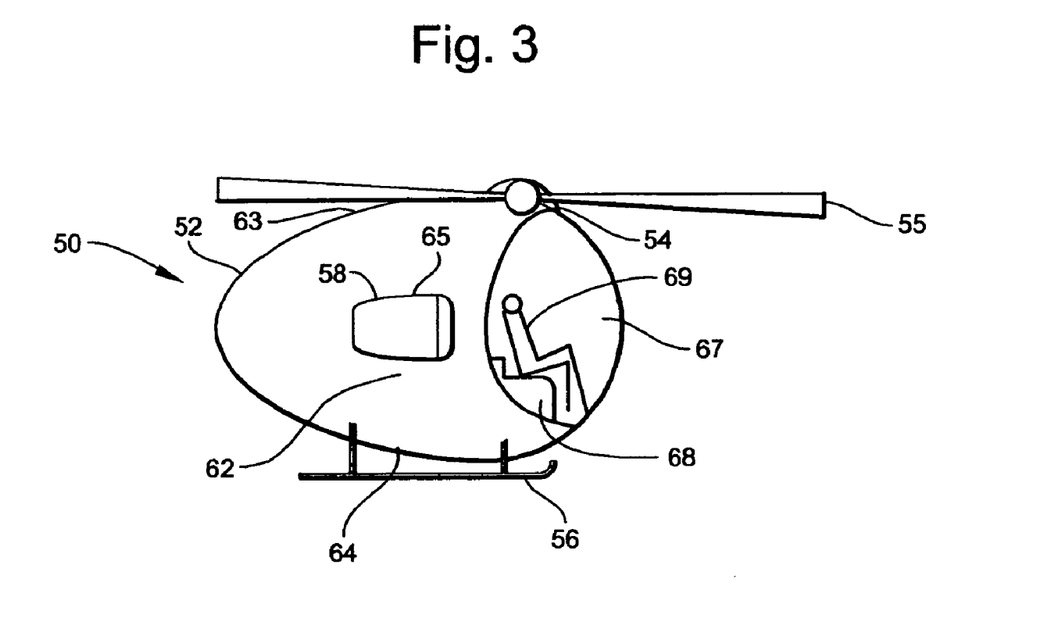
FIG. 3 is a side elevational view of a helicopter in accordance with one embodiment of the present invention.
Figure 4:
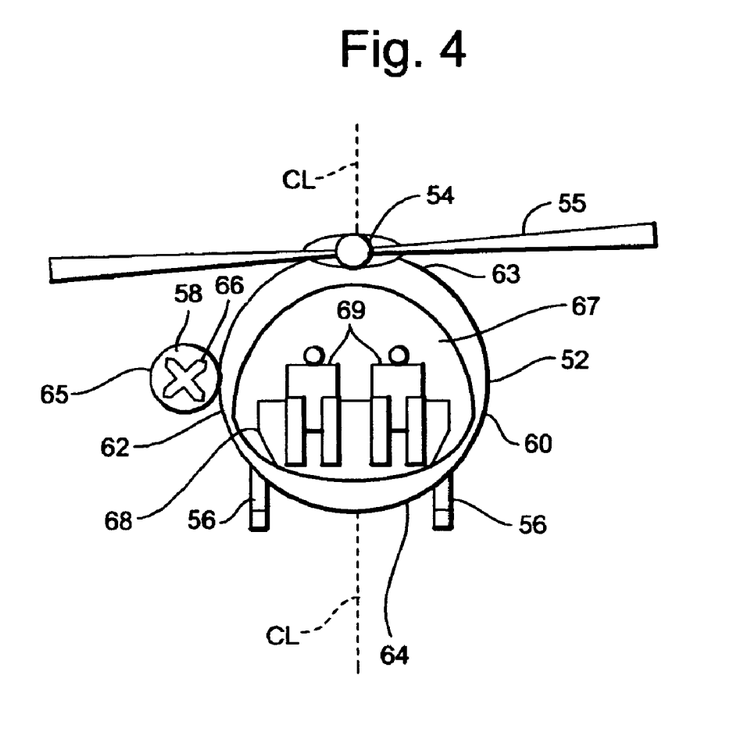
FIG. 4 is a front view of the helicopter of FIG. 3.

Referring to FIGS. 3, 4, 5 and 6, there is shown helicopter 50 in accordance with one embodiment of the present invention. Helicopter 50 comprises aerodynamic body 52 and rotor 54 that is supported by aerodynamic body 52. Rotor 54 includes rotating shaft 115 (not shown in FIGS. 3 and 4, but see FIG. 8) to which rotor blades 55 are attached. Helicopter 50 further includes landing gear 56 and thruster device 58. Aerodynamic body 52 has left and right side portions 60 and 62, respectively. As used herein, the term "left side portion" refers to that portion of the aerodynamic body 52 that is left of a center line or axis CL of rotor 54 when viewing helicopter 50 from the rear, and from the perspective of pilots 69, as shown in FIGS. 3 and 4. Similarly, as used herein, the term "right side portion" refers to that portion of the aerodynamic body 52 that is left of the center line or axis CL of rotor 54 when viewing helicopter 50 from the front, as shown in FIG. 4. As used herein, the term "side portion" may refer to either the left side portion or the right side portion. Aerodynamic body 52 further includes top and bottom portions 63 and 64, respectively. Landing gear 56 is attached to bottom portion 64. Thruster device 58 is attached to right side portion 62. In this embodiment, thruster device 58 comprises a pod 65 that is mounted or attached to exterior wall of right side portion 62 of helicopter 50. A thrust producing mechanism is located within pod 65. In one embodiment, this thrust producing mechanism comprises rotor mechanism 66. However, thruster device 58 can be configured as any one of several suitable devices capable of producing an aft-directed thrust. Examples of suitable thruster devices include jet engines, propellers, turbo-prop engines and rocket engines. Some of these alternate thruster devices are described in the ensuing description. In one embodiment, rotor mechanism 66 rotates counter-clockwise and rotor blades 55 rotate counter-clockwise. Helicopter 50 further includes cockpit 67 and seat 68. Seat 68 can be configured for one or two pilots 69.

Figure 5:
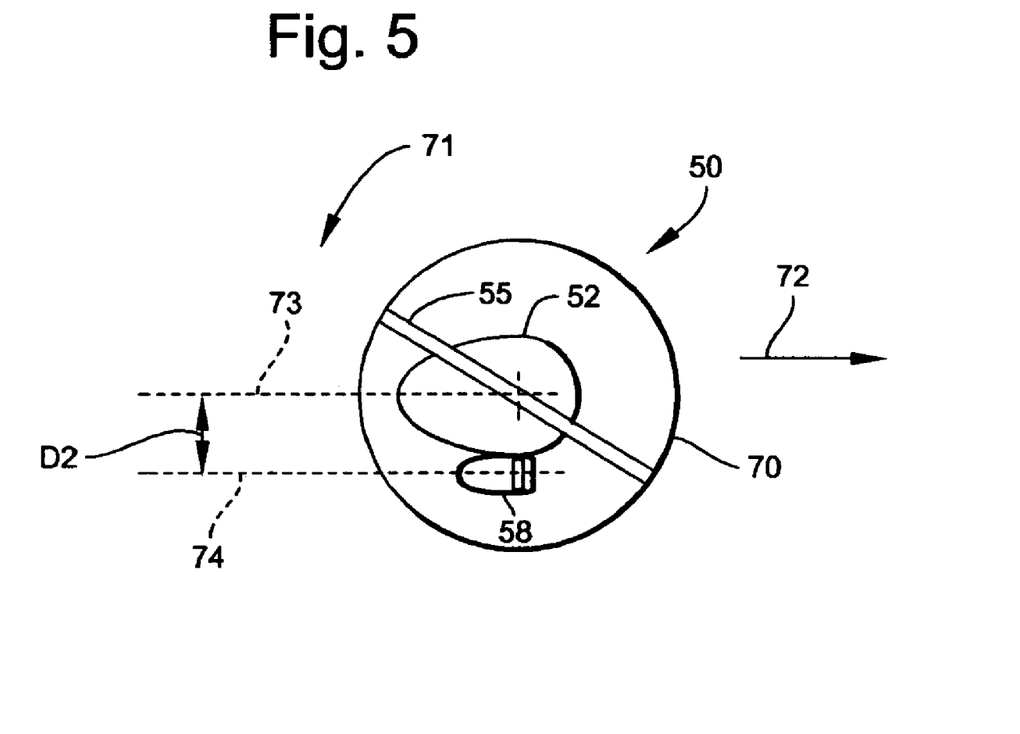
FIGS. 5 and 6 are top plan views of the helicopter of FIG. 3 in flight.
Figure 6:
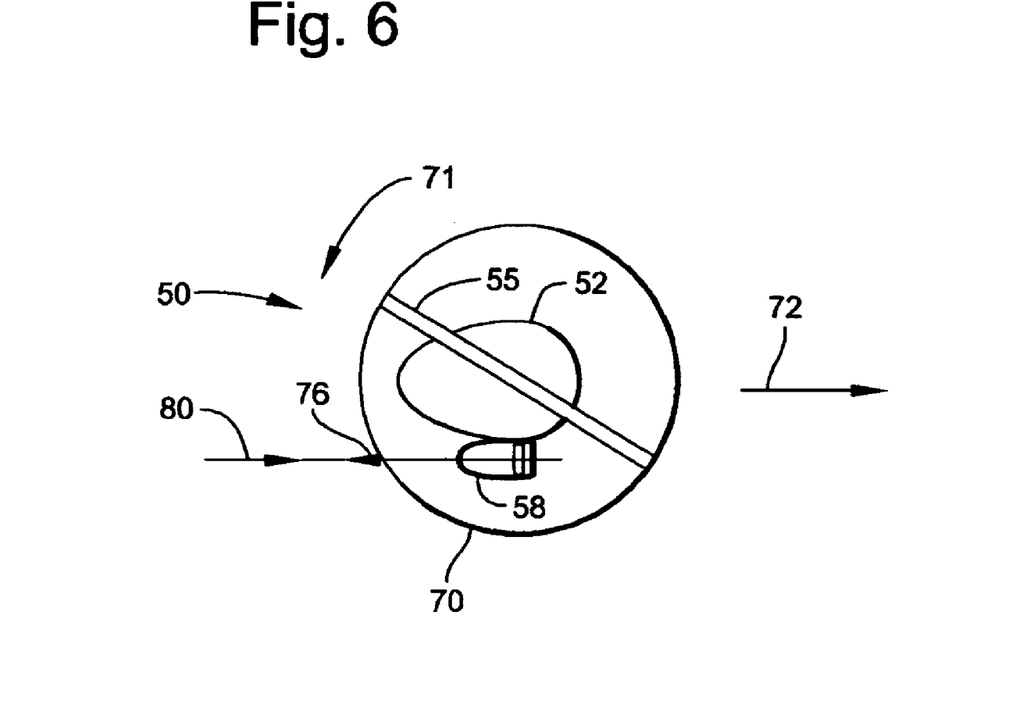

Referring to FIGS. 5 and 6, the perimeter of the area swept by rotor blades 55 is indicated by reference numeral 70 and is also referred to herein as a rotor blade operational perimeter. Rotor blades 55 rotate counter-clockwise as indicated by arrow 71. The direction of flight of helicopter 50 is indicated by arrows 72. Helicopter 50 has a moment arm that is defined by the distance between rotor 54 and thruster device 58 and which is substantially smaller than the moment arm indicated by distance D1 in prior art helicopter 20 (see FIGS. 1A and 1B). Reference axes 73 and 74 are shown in FIG. 5 to facilitate understanding of the moment arm of helicopter 50. Reference axis 73 extends through the axis of rotor 54 and reference axis 74 bisects thruster device 58. The moment arm of helicopter 50 is defined by distance D2 between reference axes 73 and 74. In accordance with the invention, thruster device 58 produces an aft-directed thrust that is indicated by reference number 76. The restoring force resulting from aft-directed thrust 76 is indicated by reference number 80. Restoring force 80 counteracts the torque generated by rotor 54 and rotor blades 55. The aft-directed thrust 76 also supplements the forward thrust of helicopter 50. An important feature of helicopter 50 is that it does not utilize an extending fuselage boom, such as fuselage boom 27 of prior art helicopter 20 (see FIGS. 1A, 1B and 1C) and therefore has no tail rotor. A significant feature of helicopter 50 is that no portion of aerodynamic body 52 extends beyond rotor blade operational perimeter 70. Thus, the overall size of helicopter 50 is relatively smaller than conventional helicopters. Another feature of helicopter 50 is that, except for thruster device 58, aerodynamic body 52 is symmetrically configured, and landing gear 56 and rotor 54 are all symmetrically located with respect to aerodynamic body 52. Seat 68 is also symmetrically located within cockpit 67.

Figure 7:
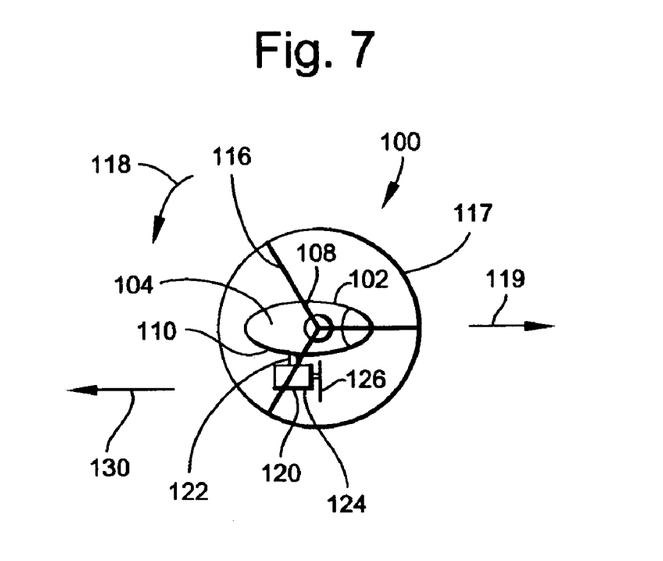
FIG. 7 is a top plan view a helicopter in accordance with another embodiment of the invention.
Figure 8:
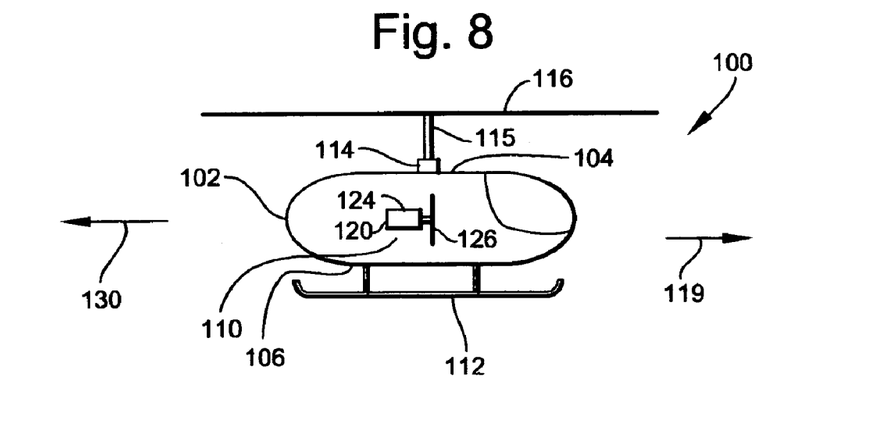
FIG. 8 is a side elevational view of the helicopter of FIG. 7.
Figure 9:
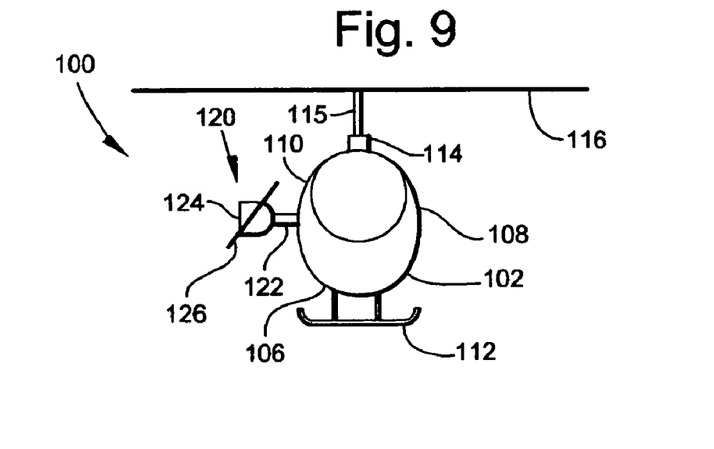
FIG. 9 is a front view of the helicopter of FIG. 7.

Referring to FIGS. 7, 8 and 9, there is shown helicopter 100 in accordance with another embodiment of the present invention. Helicopter 100 comprises aerodynamic body 102 which has top portion 104, bottom portion 106, left side portion 108 and right side portion 110. Landing gear 112 is attached to bottom portion 106. Helicopter 100 includes a rotor 114, rotating shaft 115 and rotor blades 116 that are attached to rotating shaft 115. Rotor blades 116 have rotor blade operational perimeter 117. Rotor blades 116 are rotating counter-clockwise as indicated by arrow 118. The direction of flight of helicopter 100 is indicated by arrow 119. In accordance with the invention, helicopter 100 comprises thruster device 120. Thruster device 120 comprises a supporting arm 122 that is attached to the external or exterior wall of right side portion 110. Thruster device 120 further comprises engine 124 and propeller 126 that is driven by engine 124. In one embodiment, propeller 126 is a two-bladed propeller, although a propeller having more than two blades can be used as well. Propeller 126 rotates counter-clockwise. Supporting arm 122 has a length that is sufficient to provide necessary clearance between propeller 126 and aerodynamic body 102. Thruster device 120 performs the same function as thruster device 58 described in the foregoing description. Specifically, thruster device 120 produces an aft-directed thrust 130 that counteracts the torque generated by rotor 114 and rotor blade 116 and supplements the forward thrust of helicopter 100. Except for the addition of thruster device 120, helicopter 100 is structurally symmetric.

Figure 10:
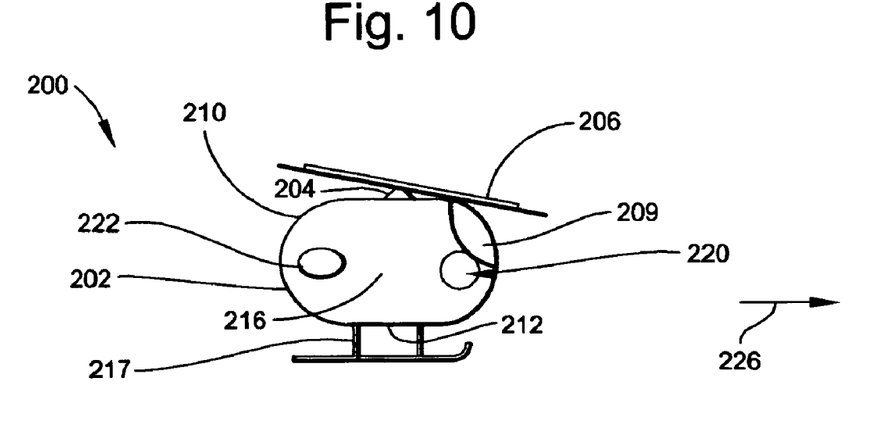
FIG. 10 is a side elevational view of a helicopter in accordance with another embodiment of the invention.
Figure 11:
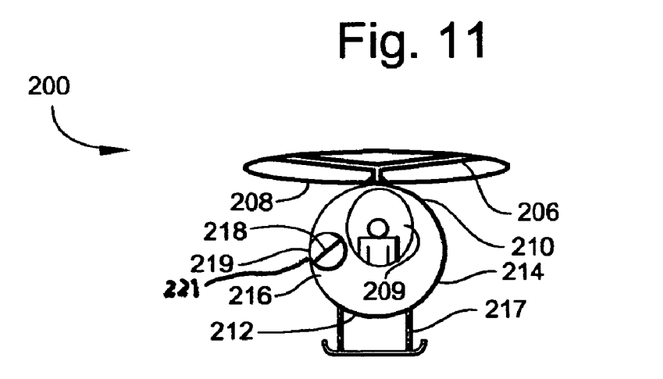
FIG. 11 is a front view of the helicopter of FIG. 10.
Figure 12:
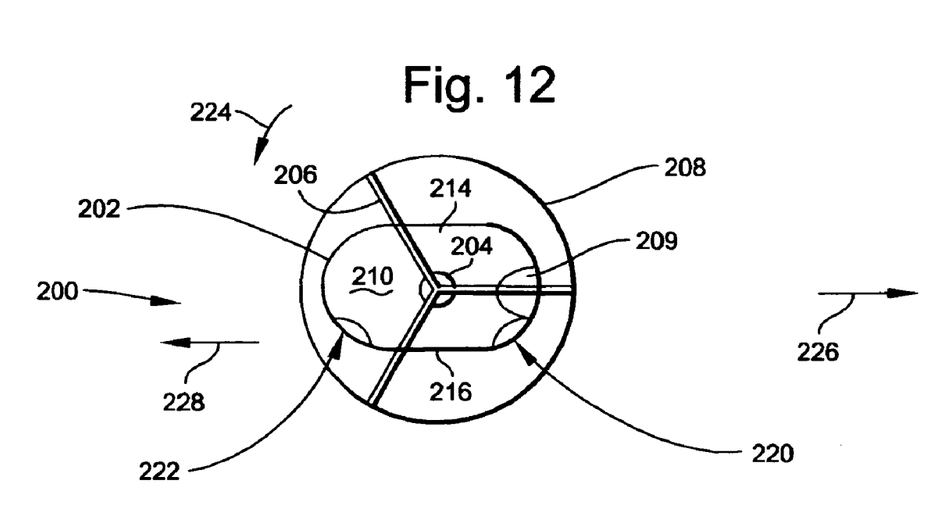
FIG. 12 is a top plan view of the helicopter of FIG. 10.

Referring to FIGS. 10–12, there is shown a helicopter in accordance with a further embodiment of the present invention. Helicopter 200 comprises aerodynamic body 202, rotor 204 and rotor blades 206. Rotor blades 206 have rotor blade operational perimeter 208. Aerodynamic body 202 includes cockpit 209, top portion 210, bottom portion 212, left side portion 214, and right side portion 216. Landing gear 217 is attached to bottom portion 212. Helicopter 200 includes thruster device 218. Thruster device 218 comprises a rotor mechanism similar to rotor mechanism 66 described in the foregoing description. However, thruster device 218 can also be configured as a jet engine. In accordance with this embodiment, thruster device 218 is incorporated within aerodynamic body 202 and located on right side portion 216. The thruster device 218 is located within the symmetrical external dimensions of helicopter 200. Aerodynamic body 202 has intake port 220 and exhaust port 222 that are integral to aerodynamic body 202. Intake port 220 and exhaust port 222 are aligned with the intake port and exhaust port, respectively, of thruster device 218. The intake port of thruster device 218 is indicated by reference number 219 and the exhaust port of the thruster device 218 is not shown. Referring to FIG. 12, rotor blades 206 rotate counter-clockwise as indicated by arrow 224. The direction of flight of helicopter 200 is indicated by reference number 226. Thruster device 218 performs the same function as thruster devices 58 and 120 described in the foregoing description. Specifically, thruster device 218 produces aft-directed thrust 228 which counteracts the torque produced by the counter-clockwise rotation of rotor blades 206 and supplements the forward thrust of helicopter 200. Thus, aft-directed thrust 228 functions as a counter-torque that counteracts the torque produced by rotor blades 206. The incorporation of thruster device 218 within aerodynamic body 202 can be combined with current stealth technology to provide a helicopter having stealth characteristics. In such an embodiment, the location of the thruster device 218 is such that current stealth technology can be readily incorporated and applied.

Figure 13:
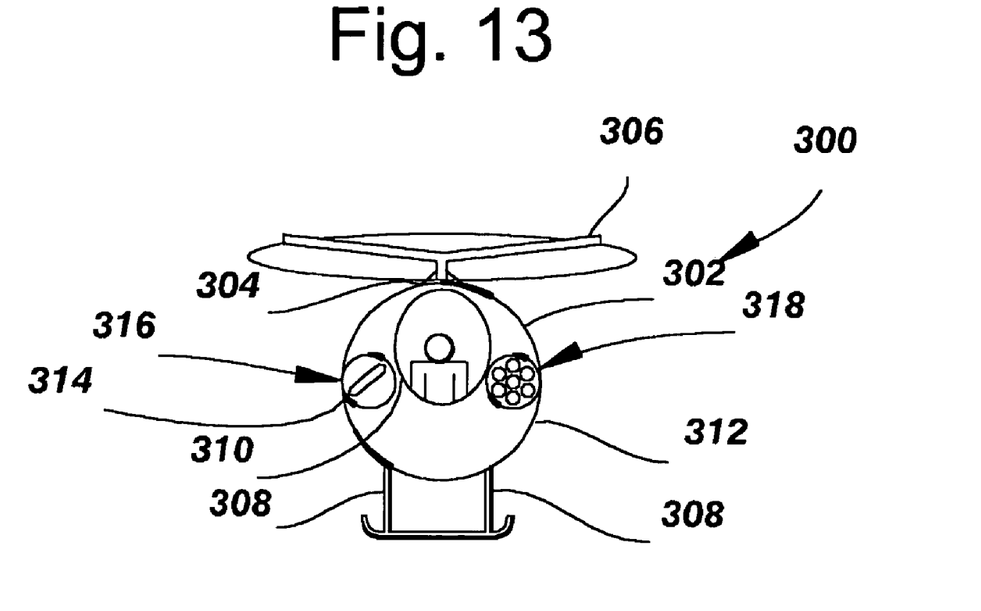
FIG. 13 is a front view of a helicopter in accordance with another embodiment of the invention.

Referring to FIG. 13, there is shown helicopter 300 in accordance with another embodiment of the present invention. Helicopter 300 is generally the same in construction as helicopter 200 with the exception of the addition of a balancing device which is described in the ensuing description. Helicopter 300 comprises aerodynamic body 302, rotor 304, rotor blades 306, and landing gear 308. Aerodynamic body 302 includes cockpit 310, left side portion 312, and right side portion 314. Helicopter 300 includes thruster device 316 that has the same function and construction as thruster device 218 described in the foregoing description. In accordance with this embodiment, thruster device 316 is incorporated within aerodynamic body 302 and located on right side portion 314 and a balancing device 318 is incorporated within aerodynamic body 302 and located on left side portion 312. The weight of balancing device 318 offsets the weight of thruster device 316. In this embodiment, balancing device 318 comprises a weapon such as a rocket launcher or machine gun. It is to be understood that balancing device 318 can be configured as any other device such as a sensor array or other type of radar component as long as balancing device 318 has a weight similar to thruster device 316. Cockpit 310 is symmetrically located within aerodynamic body 302 and is symmetrically positioned with respect to thruster device 316 and balancing device 318.

Figure 14:
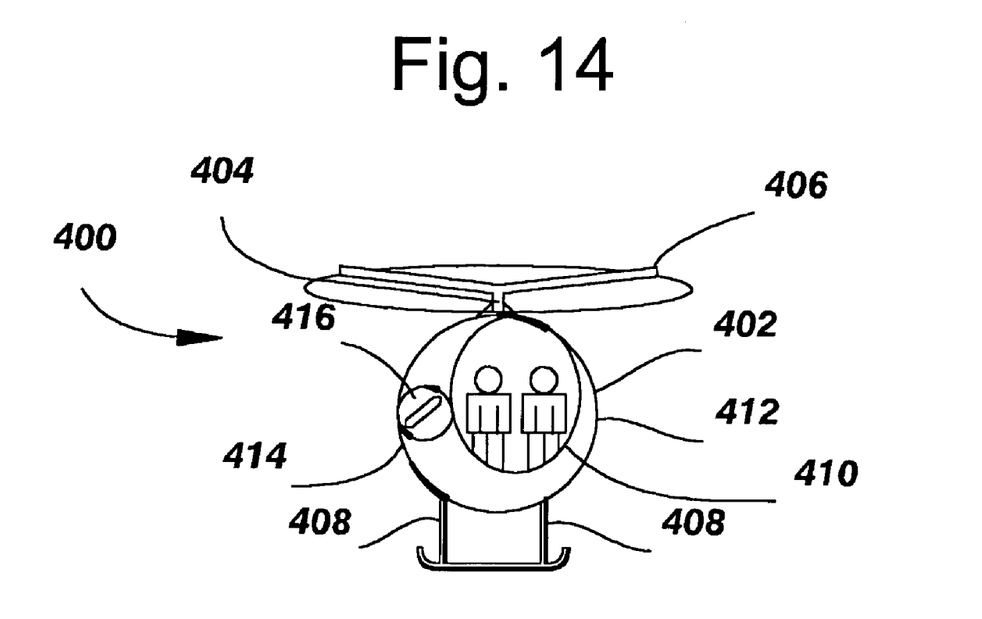
FIG. 14 is front view of a helicopter in accordance with a further embodiment of the invention.

Referring to FIG. 14, there is shown helicopter 400 in accordance with another embodiment of the present invention. Helicopter 400 comprises aerodynamic body 402, rotor 404, rotor blades 406, and landing gear 408. Aerodynamic body 402 includes cockpit 410, left side portion 412, and right side portion 414. Helicopter 400 includes thruster device 416 that has the same function and construction as thruster device 316 described in the foregoing description. In accordance with this embodiment, thruster device 416 is incorporated within aerodynamic body 402 and cockpit 410 is asymmetrically located within aerodynamic body 402 and is offset toward left side portion 412. Thus, the weight of the pilots' seat and the weight of the pilots combine to counteract the weight of thruster device 416 and provide balance to helicopter 400. Although FIG. 14 shows that cockpit 410 is configured for two pilots, it is to be understood that cockpit 410 can be configured for a single pilot.

Figure 15:
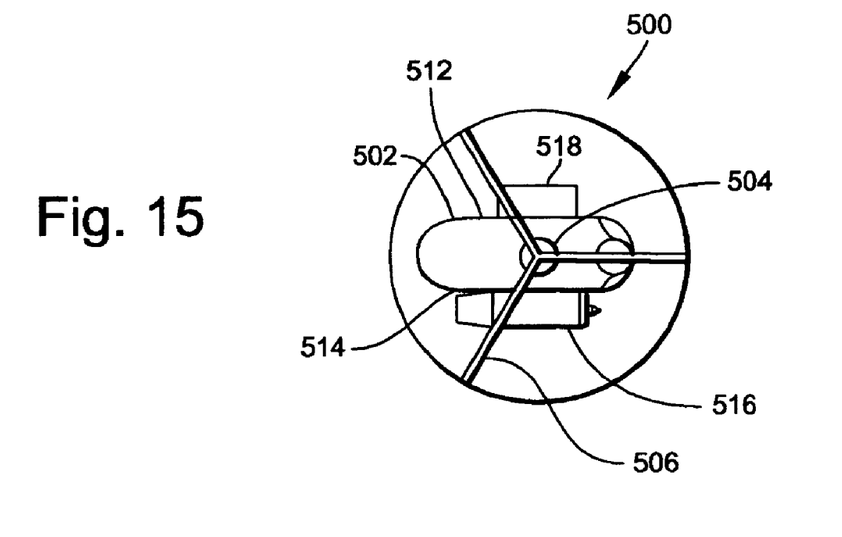
FIG. 15 is top plan view of a helicopter in accordance with another embodiment of the invention.
Figure 16:
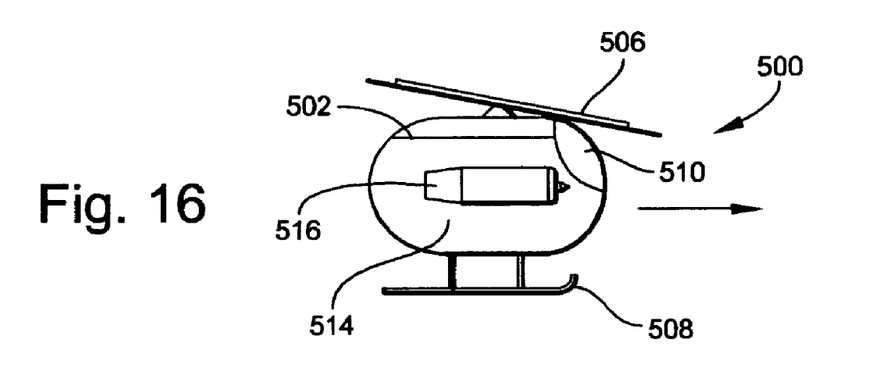
FIG. 16 is side elevational view of the helicopter of FIG. 15.
Figure 17:
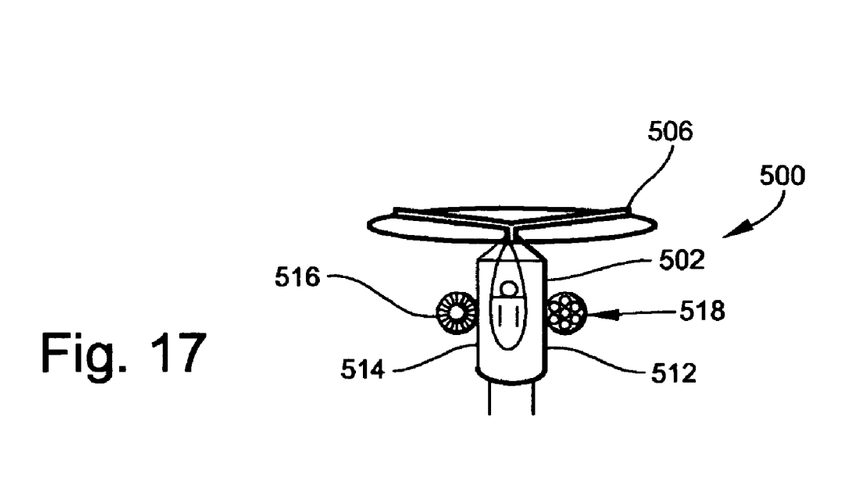
FIG. 17 is a front elevational view of the helicopter of FIG. 15.

Referring to FIGS. 15–17, there is shown a helicopter in accordance with another embodiment of the invention wherein the thruster device and balancing device are located external to the aerodynamic body of the helicopter and on opposite side portions of the aerodynamic body. Helicopter 500 comprises aerodynamic body 502, rotor 504, rotor blades 506, and landing gear 508. Aerodynamic body 502 includes cockpit 510, left side portion 512, and right side portion 514. Helicopter 500 includes thruster device 516 that has the same purpose as thruster devices 58, 120, 218 and 316 described in the foregoing description, i.e. to produce an aft-directed thrust that counteracts the torque produced by the rotor 504 and supplements the forward thrust of helicopter 500. In this embodiment, thruster device 516 is configured as a jet engine. In accordance with this embodiment, thruster device 516 is mounted or attached to the exterior or external wall of right side portion 514 and a balancing object 518 is mounted or attached to the exterior or external wall of left side portion 512. The weight of balancing device 518 offsets the weight of thruster device 516. In this embodiment, balancing device 518 comprises a weapon such as a rocket launcher or machine gun. It is to be understood that balancing device 518 can be configured as any other suitable device necessary for completion of a mission, such as a sensor array or other type of radar component. Cockpit 510 is symmetrically located within aerodynamic body 502 and is symmetrically located with respect to thruster device 516 and balancing device 518.

In an alternate embodiment, the rotor is offset to the side portion that is opposite the side portion on which the thruster device is operative.

Although the foregoing description is in terms of the thruster device being located generally under the rotor blades and adjacent to the rotor, other configurations are possible. For example, if the helicopter is configured to have a relatively smaller size, in comparison to prior art helicopters, and such smaller size helicopter has a small sized boom, then the thruster device can be mounted to the appropriate side of the boom.

In a preferred embodiment, a pilot piloting the helicopter of the present invention does not directly control the thruster device in order to control yaw of the helicopter. Preferably, the actual power of the thruster device and the generated counter torque is controlled by on-board control devices that respond automatically to an increase or decrease in forward speed or assent or descent of the helicopter. Thus, the pilot's maneuvering of the throttle, lever, joystick, or any control device results in automatic adjustments to the operation of the thruster device.

In another embodiment, the helicopter of the present invention is configured to operate without a pilot.

The principles, preferred embodiments and modes of operation of the present invention have been described in the foregoing specification. The invention which is intended to be protected herein should not, however, be construed as limited to the particular forms disclosed, as these are to be regarded as illustrative rather than restrictive. Variations in changes may be made by those skilled in the art without departing from the spirit of the invention. Accordingly, the foregoing detailed description should be considered exemplary in nature and not limited to the scope and spirit of the invention as set forth in the attached claims.

What is claimed is:

1. A helicopter comprising:

an aerodynamic body having opposite side portions, a top portion and a bottom portion, the aerodynamic body having a cockpit:

a pilot seat in the cockpit;

landing gear attached to the bottom portion of the aerodynamic body;

a rotor supported by the aerodynamic body, the rotor having a portion extending from the top portion of the aerodynamic body;

rotor blades attached to the portion of the rotor that extends from the top portion of the aerodynamic body, the rotor blades rotating above the aerodynamic body wherein rotation of the rotor blades produces a torque; and a thruster device operative on one of the side portions of the aerodynamic body to produce an aft-directed thrust that counteracts the torque to control a yaw of the helicopter and supplement forward thrust of the helicopter wherein the thruster device includes an air intake port and an exhaust port, and wherein the thruster device is incorporated into the aerodynamic body, the aerodynamic body having openings therein that are aligned with the air intake and exhaust ports of the thruster device.

2. The helicopter according to claim 1 wherein the thruster device comprises a jet engine.

3. A helicopter comprising:

an aerodynamic body having opposite side portions, a top portion and a bottom portion, the aerodynamic body having a cockpit;

a pilot seat in the cockpit;

landing gear attached to the bottom portion of the aerodynamic body;

a rotor supported by the aerodynamic body, the rotor having a portion extending from the top portion of the aerodynamic body;

rotor blades attached to the portion of the rotor that extends from the top portion of the aerodynamic body, the rotor blades rotating above the aerodynamic body wherein rotation of the rotor blades produces a torque;

a thruster device operative on one of the side portions of the aerodynamic body to produce an aft-directed thrust that counteracts the torque to control a yaw of the helicopter and supplement forward thrust of the helicopter; and a balancing device attached to the side portion of the aerodynamic body that is opposite the side portion on which the thrusting device is operative so as to balance the helicopter.

4. A helicopter comprising:

an aerodynamic body having opposite side portions, a top portion and a bottom portion, the aerodynamic body having a cockpit;

a pilot seat in the cockpit;

landing gear attached to the bottom portion of the aerodynamic body;

a rotor supported by the aerodynamic body, the rotor having a portion extending from the top portion of the aerodynamic body;

rotor blades attached to the portion of the rotor that extends from the top portion of the aerodynamic body, the rotor blades rotating above the aerodynamic body wherein rotation of the rotor blades produces a torque; and a thruster device operative on one of the side portions of the aerodynamic body to produce an aft-directed thrust that counteracts the torque to control a yaw of the helicopter and supplement forward thrust of the helicopter;

wherein the pilot's seat is offset to the side portion of the aerodynamic body that is opposite the side portion on which the thrusting device is operative so as to balance the helicopter.

* * * * *